United States Patent
Safavi (10) Patent No.: US 9,226,171 B2
(45) Date of Patent: Dec. 29, 2015

(54) METHOD AND APPARATUS FOR COMBINED ADAPTIVE BEAMFORMING AND MIMO IN INDOOR WIRELESS LAN

(71) Applicant: Futurewei Technologies, Inc., Plano, TX (US)

(72) Inventor: Saeid Safavi, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 188 days.

(21) Appl. No.: 13/712,545

(22) Filed: Dec. 12, 2012

(65) Prior Publication Data

US 2014/0086077 A1    Mar. 27, 2014

Related U.S. Application Data

(60) Provisional application No. 61/705,773, filed on Sep. 26, 2012.

(51) Int. Cl.

| | |
|---|---|
| *H04W 4/00* | (2009.01) |
| *H04H 20/67* | (2008.01) |
| *H04B 7/185* | (2006.01) |
| *H01Q 3/00* | (2006.01) |
| *H04M 1/00* | (2006.01) |
| *H04W 24/02* | (2009.01) |
| *H04W 16/28* | (2009.01) |

(Continued)

(52) U.S. Cl.
CPC .............. *H04W 24/02* (2013.01); *H04W 16/28* (2013.01); *H04B 7/2041* (2013.01); *H04W 84/12* (2013.01)

(58) Field of Classification Search
CPC ..... H04W 24/02; H04W 16/28; H04W 84/12; H04B 7/2041

USPC .............. 455/436, 444, 562.1, 522, 101, 133, 455/561; 375/260; 370/338, 339; 342/354, 342/368

See application file for complete search history.

(56) References Cited

U.S. PATENT DOCUMENTS

| | | | |
|---|---|---|---|
| 7,574,236 B1 * | 8/2009 | Mansour | 455/562.1 |
| 2005/0085266 A1 * | 4/2005 | Narita | 455/561 |

(Continued)

FOREIGN PATENT DOCUMENTS

| | | |
|---|---|---|
| CN | 101741446 A | 6/2010 |
| CN | 102104406 A | 6/2011 |

OTHER PUBLICATIONS

Foreign Communication From a Counterpart Application, PCT Application No. PCT/CN2013/085047, International Search Report dated Jan. 16, 2014, 7 pages.

(Continued)

*Primary Examiner* — Alpus H Hsu
*Assistant Examiner* — Camquyen Thai
(74) *Attorney, Agent, or Firm* — Conley Rose, P.C.; Grant Rodolph; William H. Dietrich (57) ABSTRACT

A wireless local area network (WLAN) device comprising a processor, a transceiver coupled to the processor, a switching mechanism coupled to the transceiver, a beamforming antenna assembly coupled to the switching mechanism, and a multiple input, multiple output (MIMO) antenna assembly coupled to the switching mechanism. Included is an apparatus comprising a processor and a memory coupled to the processor, wherein the memory comprises instructions that cause the processor to calibrate a WLAN device, select an optimal antenna configuration, track the WLAN device performance, and wait for a triggering event. Also included is an adaptive antenna method comprising calibrating a WLAN device, selecting an optimal antenna configuration, tracking the WLAN device performance, and waiting for a triggering event.

16 Claims, 4 Drawing Sheets

(51) Int. Cl.
*H04W 84/12* (2009.01)
*H04B 7/204* (2006.01)

(56) References Cited

U.S. PATENT DOCUMENTS

| | | | |
|---|---|---|---|
| 2010/0016023 A1* | 1/2010 | Yamauchi et al. | 455/562.1 |
| 2010/0081469 A1* | 4/2010 | Kazmi et al. | 455/522 |
| 2010/0091892 A1* | 4/2010 | Gorokhov | 375/260 |
| 2013/0143578 A1* | 6/2013 | Lekutai | 455/444 |

OTHER PUBLICATIONS

Foreign Communication From a Counterpart Application, PCT Application No. PCT/CN2013/085047, Written Opinion dated Jan. 16, 2014, 4 pages.

Winkle, "Beamforming: The Best WiFi You've Never Seen," Tom's Hardware, Competitive Product Review, http://www.tomshardware.com/reviews/beamforming-wifi-ruckus,2390.html; Aug. 2009, 15 pages.

* cited by examiner

METHOD AND APPARATUS FOR COMBINED ADAPTIVE BEAMFORMING AND MIMO IN INDOOR WIRELESS LAN

CROSS-REFERENCE TO RELATED APPLICATIONS

The present application claims benefit of U.S. Provisional Patent Application No. 61/705,773 filed Sep. 26, 2012 by Saeid Safavi and entitled "Method and Apparatus for Combined Adaptive Beamforming and MIMO in Indoor Wireless LAN," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As wireless local access network (WLAN) and WiFi technologies evolve, the demand increases to support a higher capacity (e.g., more users) while maintaining throughput and quality of service (QoS). Additionally, as the number of users and user terminals increases the hostility of the transmission environment may also increase, which may result in more interference, spectral inefficiencies, and lower data throughput for individual users. For example, in a widely dynamic broadband wireless (e.g., WiFi) environment (e.g., a business center, an office, a hotel, a hospital, etc.), unlicensed bands, multipath distortion, and obstructions may degrade the performance in a conventional WLAN device.

Conventional WLAN devices, systems, and methods may employ a beamforming antenna system to improve the efficiency (e.g., spectral efficiency, data throughput, etc.) of the system and to alleviate the hostility of the transmission environment. For example, a beamforming antenna system may be employed to direct and/or to steer an antenna radio frequency (RF) pattern towards one or more users. Conventional beamforming approaches do not perform well in an indoor environment due to multipath distortion and obstructions which may degrade the generated beam. Other conventional WLAN devices, systems, and methods may employ a multiple-input and multiple-output (MIMO) antenna. Such conventional approaches may not perform well in some environments, for example, in the presence of interference. Additionally, channel state information (CSI) degradation and multipath distortion may cause the gain of MIMO systems to rapidly attenuate when moving away from a transmitter. As such, devices, systems, and methods for more efficiently enhancing the spectral efficiency and interference mitigation are needed.

SUMMARY

Disclosed herein is a wireless local area network device comprising a processor, a transceiver coupled to the processor, a switching mechanism coupled to the transceiver, a beamforming antenna assembly coupled to the switching mechanism, and a MIMO antenna assembly coupled to the switching mechanism.

Also disclosed herein is an apparatus comprising a processor and a memory coupled to the processor, wherein the memory comprises instructions that cause the processor to calibrate a WLAN device, select an optimal antenna configuration, track the WLAN device performance, and wait for a triggering event.

Further disclosed herein is an adaptive antenna method comprising calibrating a WLAN device, selecting an optimal antenna configuration, tracking the WLAN device performance, and waiting for a triggering event.

BRIEF DESCRIPTION OF THE DRAWINGS

For a more complete understanding of this disclosure, reference is now made to the following brief description, taken in connection with the accompanying drawings and detailed descriptions, wherein like reference numerals represent like parts.

DETAILED DESCRIPTION OF THE EMBODIMENTS

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of an adaptive antenna method utilizing combined beamforming techniques and MIMO antenna techniques and/or a WLAN device employing an adaptive antenna method utilizing combined beamforming techniques and MIMO antenna techniques. In an embodiment, such a method may be employed to provide the ability to select an antenna configuration and to generate an antenna RF beam or pattern towards one or more target users, thereby improving data throughput and improving spectral efficiency of the WLAN device, as will be disclosed herein.

Figure 1:
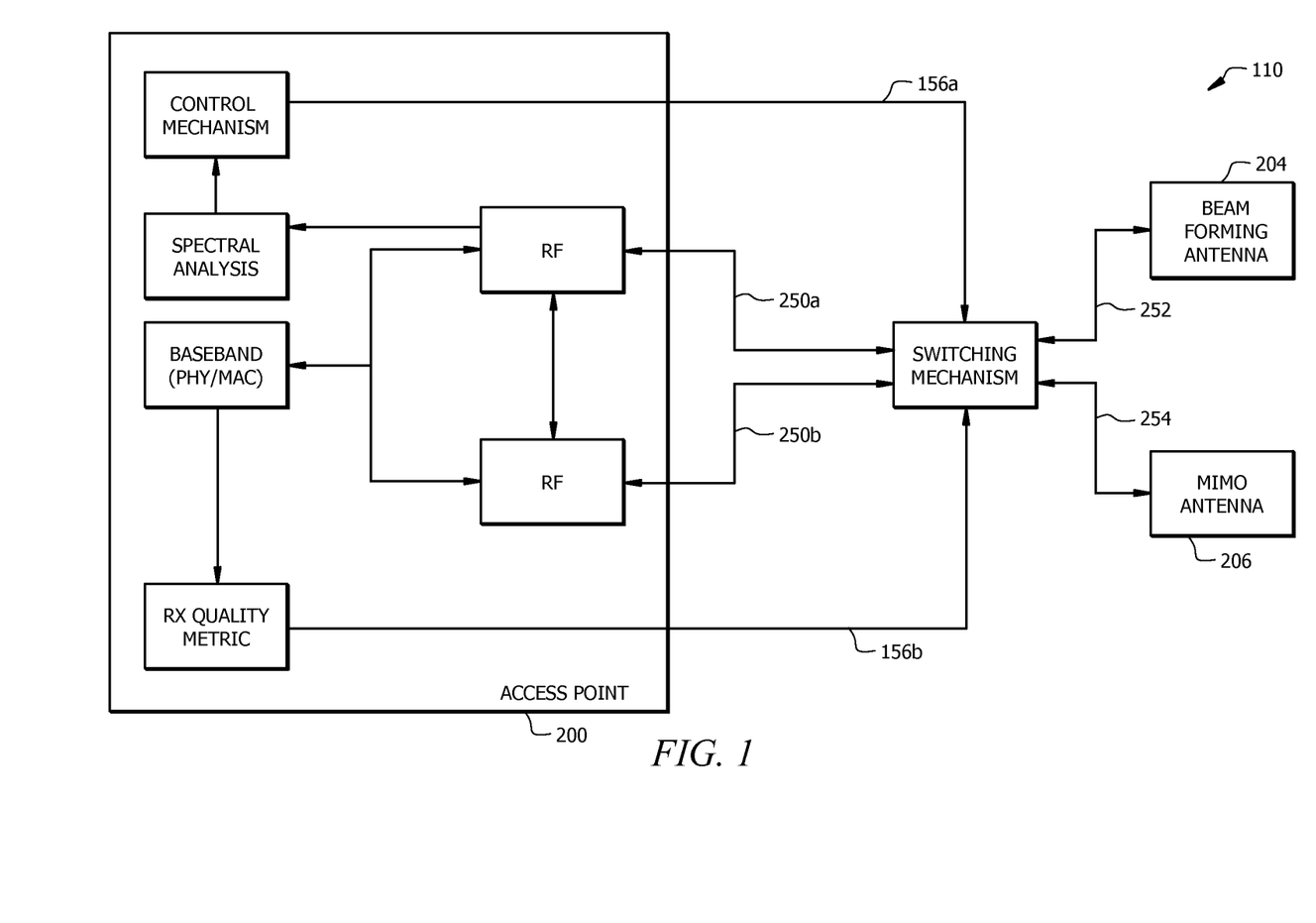
FIG. 1 is a schematic diagram of an embodiment of a portion of a network connectivity device.

In an embodiment, a WLAN device may comprise a network connectivity device generally configured as an output and/or an input device of a WLAN device and may be configured to communicate with the Internet, an intranet, a wireless network (e.g., a WiFi network, a WiMAX network, etc.), and/or one or more clients. For example, the network connectivity device may comprise an access point, a router, a modem, a modem bank, an Ethernet card, a universal serial bus (USB) interface card, a serial interface, a token ring card, a fiber distributed data interface (FDDI) card, a WLAN card, a radio transceiver card, an air interface protocol radio transceiver card, a transceiver, a medium access controller, one or more antennas, an antenna array, an antenna switch, any other suitable type and/or configuration of network communication components or devices as would be appreciated by one of ordinary skill in the art upon viewing this disclosure, or combination thereof. In the embodiment of FIG. 1, the network connectivity device 110 may generally comprise the access point 200, a switching mechanism 202, a beamforming antenna assembly 204, and a MIMO antenna assembly 206.

In an embodiment, the access point 200 may be configured to conform to Institute of Electrical and Electronics Engineers (IEEE) 802.11 and/or 802.16 standards and/or protocols. In an additional or alternative embodiment, the access point 200 may be configured to conform to any other suitable standards and/or protocols as would be appreciated by one of ordinary skill in the arts upon viewing this disclosure, for example, 4G cellular networks.

In an embodiment, the access point 200 may be generally to provide wireless communications to/from a WLAN device, to process and/or to analyze (e.g., a statistical analysis) electrical signal, and/or to communicate one or more control signals (e.g., to control the switching mechanism 202 via electrical connections 156a-156b). In an embodiment, the access point 200 may generally comprise a baseband processor, a front-end module (FEM), a radio frequency (RF) transmitter, a RF receiver, a RF transceiver, a digital signal processor (DSP), any other suitable type of RF communication components as would be appreciated by one of ordinary skill in the art upon viewing this disclosure, or combination thereof.

In an embodiment, the access point 200 may be configured to communicate a media access control (MAC) layered data signal with a FEM, for example, via a baseband processor. In an embodiment, the baseband processor may be generally configured to provide addressing and/or to provide channel access control mechanisms (e.g., for controlling data signal traffic). For example, the baseband processor may be configured to implement a carrier sense multiple access (CSMA) protocol, a CSMA with collision avoidance (CSMA/CA) protocol, a CSMA with collision detection (CSMA/CD) protocol, a CSMA with collision avoidance and resolution using priorities (CSMA/CARP) protocol, multiple access with collision avoidance (MACA) protocol, MACA for wireless (MACAW) protocol, a pure ALOHA protocol, a slotted ALOHA protocol, a reservation ALOHA (R-ALOHA) protocol, a mobile slotted ALOHA (MS-ALOHA) protocol, a dynamic time division multiple access protocol (TDMA) protocol, a distributed coordination function (DCF), a point coordination function (PCF), a hybrid coordination function (HCF), or any other suitable media access protocol as would be appreciated by of ordinary skill in the art upon viewing this disclosure.

Additionally or alternatively, the access point 200 may be configured to communicate a MAC layered data signal with the baseband processor and to communicate an electrical signal with the switching mechanism 202 (e.g., via electrical connections 250a-250b). In an embodiment, the access point 200 may be generally configured to filter an electrical signal (e.g., a MAC layered data signal), to amplify an electrical signal, to mix an electrical signal (e.g., up-convert an electrical signal or down-convert an electrical signal), to modulate an electrical signal, to control or configure an electrical current flow path (e.g., open or close one or more antenna switches), any other suitable signal processing as would be appreciated by one of ordinary skill in the art upon viewing this disclosure, or combination thereof. Additionally, in an embodiment the access point 200 may be configured to modulate an electrical signal, for example, to implement frequency hopping spread spectrum (FHSS) modulation, direct sequence spread spectrum (DSSS) modulation, orthogonal frequency division multiplexing (OFDM), high rate direct sequence spread spectrum (HR-DSSS), or any other suitable modulation technique as would be appreciate by one of ordinary skill in art upon viewing this disclosure.

In an embodiment, the switching mechanism 202 may be controllable and/or configured to selectively provide one or more electrical channels between the access point 200 and the beamforming antenna assembly 204 and/or the MIMO antenna assembly 206. For example, the switching mechanism 202 may be controlled by the access point 200 and may be configured to provide one or more electrical channels dependent on a desired antenna configuration and/or antenna topology, as will be disclosed herein.

In an embodiment, the switching mechanism 202 may be configured to communicate an electrical signal (e.g., a control signal and/or a data packet) with the access point 200 (e.g., via electrical connections 250a-250b) and to communicate a data signal (e.g., a data packet) with the beamforming antenna assembly 204 (e.g., via electrical connection 252) and/or to the MIMO antenna assembly 206 (e.g., via electrical connection 254). Additionally, the switching mechanism 202 may be configured to receive a control signal from the access point 200 (e.g., via electrical connection 156a-156b), for example, for controlling and/or configuring one or more switches and/or or electrical channels of the switching mechanism 202.

In the embodiment of FIG. 1, the beamforming antenna assembly 204 may be configured to interface and/or to couple with the switching mechanism 202 (e.g., via electrical connection 252) and to receive and/or transmit a RF signal (e.g., WiFi signal) to/from a WLAN device. In an embodiment, the beamforming antenna assembly 204 may comprise generally an array of antenna elements and may be configured to control the directionality and shape of an antenna RF beam using directional elements and by switching or combining between these elements to change the array's directionality, rather than using a phase array, which gives directionality according to the relive phase of each antenna element. For example, the beamforming antenna assembly 204 may be configured such that RF signals are transmitted and/or received at various antenna elements causing constructive interference and/or destructive interference, thereby adjusting and/or generating an antenna RF beam. However, without loss of generality any suitable beamforming structure and/or method may be used herewith.

In an embodiment, the beamforming antenna assembly 204 may generally comprise a plurality of antenna elements. In an embodiment, the antenna elements may be configured to transmit and/or to receive a RF signal (e.g., a WiFi signal) and to be responsive to one or more predetermined frequency bands. For example, the antenna elements may be configured to be responsive to a RF signal (e.g., a WiFi signal) within a predetermined frequency band, for example, a frequency band as defined by the IEEE 802.11 and/or 802.16 standards (e.g., the 2.4-gigahertz (GHz) band or the 5 GHz band). In an additional or alternative embodiment, the antenna elements may be configured to be responsive to any other suitable frequency band as would be appreciate by one of ordinary skill in the art upon viewing this disclosure. In an embodiment, the antenna elements may generally comprise a monopole antenna, a dipole antenna, a folded dipole antenna, a patch antenna, a microstrip antenna, a loop antenna, an omnidirectional antenna, a directional antenna, a planar inverted-F antenna (PIFA), a folded inverted conformal antenna (FICA), any other suitable type and/or configuration of antenna as would be appreciated by one of ordinary skill in the art upon viewing this disclosure, or combinations thereof. In an embodiment, the beamforming antenna assembly 204 may be configured to have spatial separation between antenna elements dependent on the wavelength of a RF signal (e.g., a WiFi signal) within a predetermined frequency band. In an embodiment, a beamforming antenna assembly 204 may comprise any suitable number and/or type of antenna elements as would be appreciated by one of ordinary skill in the art upon viewing this disclosure.

In the embodiment of FIG. 1, the MIMO antenna assembly 206 may be configured to interface and/or to couple with the switching mechanism 202 (e.g., via electrical connection 254) and to receive and/or transmit a RF signal (e.g., WiFi signal) to/from a WLAN device. In an embodiment, the MIMO antenna assembly 206 may comprise generally an array of antenna elements and/or a phased array and may be configured to provide spatial diversity, spatial multiplexing, time diversity, frequency diversity, and/or any combination thereof. For example, the MIMO antenna assembly 206 may be configured such that a data stream may be replicated and transmitted via multiple antenna elements. In an alternative embodiment, the MIMO antenna assembly 206 may be configured such that a data stream may be split into multiple data streams and each data stream is transmitted from a different transmitting antenna operating in the same time-frequency resource allocated for a receiver. MIMO structures and methods (e.g., space time block coding (STBC), spatial multiplexing (SM-MIMO), collaborative uplink MIMO, etc.) are well known in the art, and any suitable MIMO structure and/or method may be used herewith.

In an embodiment, the MIMO antenna assembly 206 may generally comprise a plurality of antenna elements. In an embodiment, the antenna elements may be configured to transmit and/or to receive a RF signal (e.g., a WiFi signal) and to be responsive to one or more predetermined frequency bands. For example, the antenna elements may be configured to be responsive to a RF signal (e.g., a WiFi signal) within a predetermined frequency band, for example, a frequency band as defined by the IEEE 802.11 and/or 802.16 standards (e.g., the 2.4-GHz band or the 5 GHz band). In an additional or alternative embodiment, the antenna elements may be configured to be responsive to any other suitable frequency band as would be appreciated by one of ordinary skill in the art upon viewing this disclosure. In an embodiment, the antenna elements may generally comprise a monopole antenna, a dipole antenna, a folded dipole antenna, a patch antenna, a microstrip antenna, a loop antenna, an omnidirectional antenna, a planar inverted-F antenna (PIFA), a folded inverted conformal antenna (FICA), any other suitable type and/or configuration of antenna as would be appreciated by one of ordinary skill in the art upon viewing this disclosure, or combinations thereof. In an embodiment, a MIMO antenna assembly 206 may comprise any suitable number and/or type of antenna elements as would be appreciated by one of ordinary skill in the art upon viewing this disclosure.

In an alternative embodiment, a beamforming antenna assembly and a MIMO antenna assembly may share and/or comprise common resources. For example, in an embodiment, a beamforming antenna assembly and a MIMO antenna assembly may share one or more antenna elements. In an alternative embodiment, a beamforming antenna assembly and a MIMO antenna assembly may share all of their antenna elements.

Figure 2:
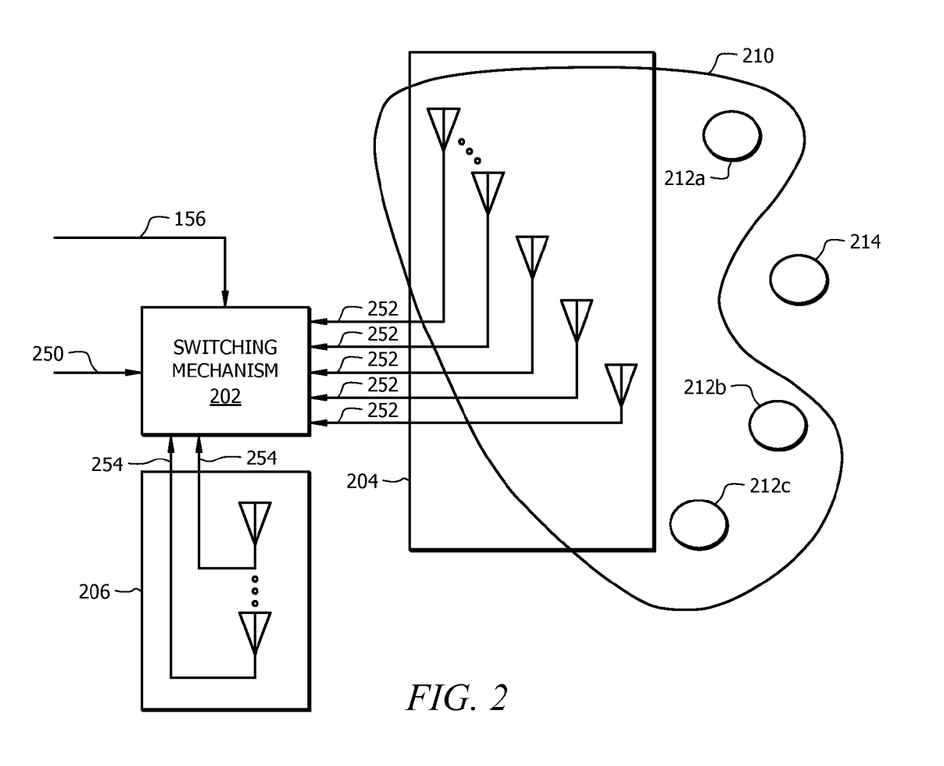
FIG. 2 is a schematic diagram of an embodiment of a beamforming antenna assembly and a MIMO antenna assembly implementation.

In an embodiment, a WLAN device and/or a network connectivity device may be configured to employ an adaptive antenna method, for example, using beamforming techniques in combination with MIMO techniques to adaptively calibrate and track the performance of a WLAN device to improve the spectral efficiency and mitigate interference via implementing an optimal antenna configuration. In an embodiment, implementing an antenna configuration may generally comprise activating one or more antenna elements of the beamforming antenna assembly 204 and/or the MIMO antenna assembly 206 to generate a desired antenna RF beam or pattern. In the embodiment of FIG. 2, a WLAN device and/or the switching mechanism 202 of a WLAN device may be configured activate the beamforming antenna assembly 204 or the MIMO antenna assembly 206 to generate an antenna RF beam 210 which communicates with one or more clients (e.g., clients 212a-212c) and substantially ignores noise sources (e.g., noise source 214).

Figure 3:
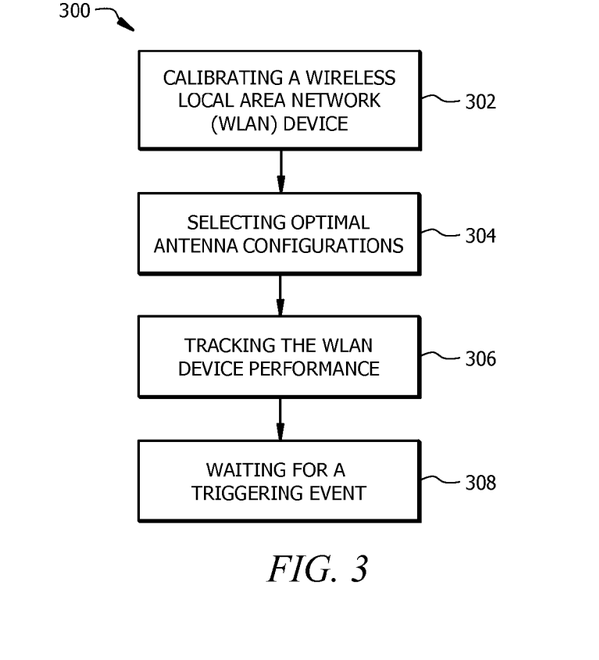
FIG. 3 is a flow chart of an embodiment of an adaptive antenna method.

In an embodiment, an adaptive antenna method utilizing beamforming techniques in combination with MIMO techniques is disclosed herein. In an embodiment, as illustrated in FIG. 3, an adaptive antenna method 300 may generally comprise the steps of calibrating a WLAN device 302, selecting optimal antenna configurations 304, tracking the WLAN device performance 306, and waiting for a triggering event 308. In an embodiment when calibrating a WLAN device 302, based on the performance measurements (e.g., a spectral analysis) and/or statistical analysis results, an antenna configuration may be individually selected and/or implemented for each client. In an embodiment when selecting an optimal antenna configuration 304, the selected antenna configuration may be implemented. For example, a beamforming antenna may be selected and configured such that an RF beam is generated which provides optimal performance (e.g., highest throughput, highest signal to interference plus noise ratio (SINR), etc.) for a client. In an embodiment when tracking the WLAN device performance 306, the performance of one or more of the implemented antenna configurations may be continued to be monitored and/or tracked. In an embodiment when waiting for a triggering event 308, the WLAN device may become idle (e.g., no longer performing calibration or tracking of one or more antenna configurations) until activated by a triggering event (e.g., a timer, a control signal, etc.).

Figure 4:
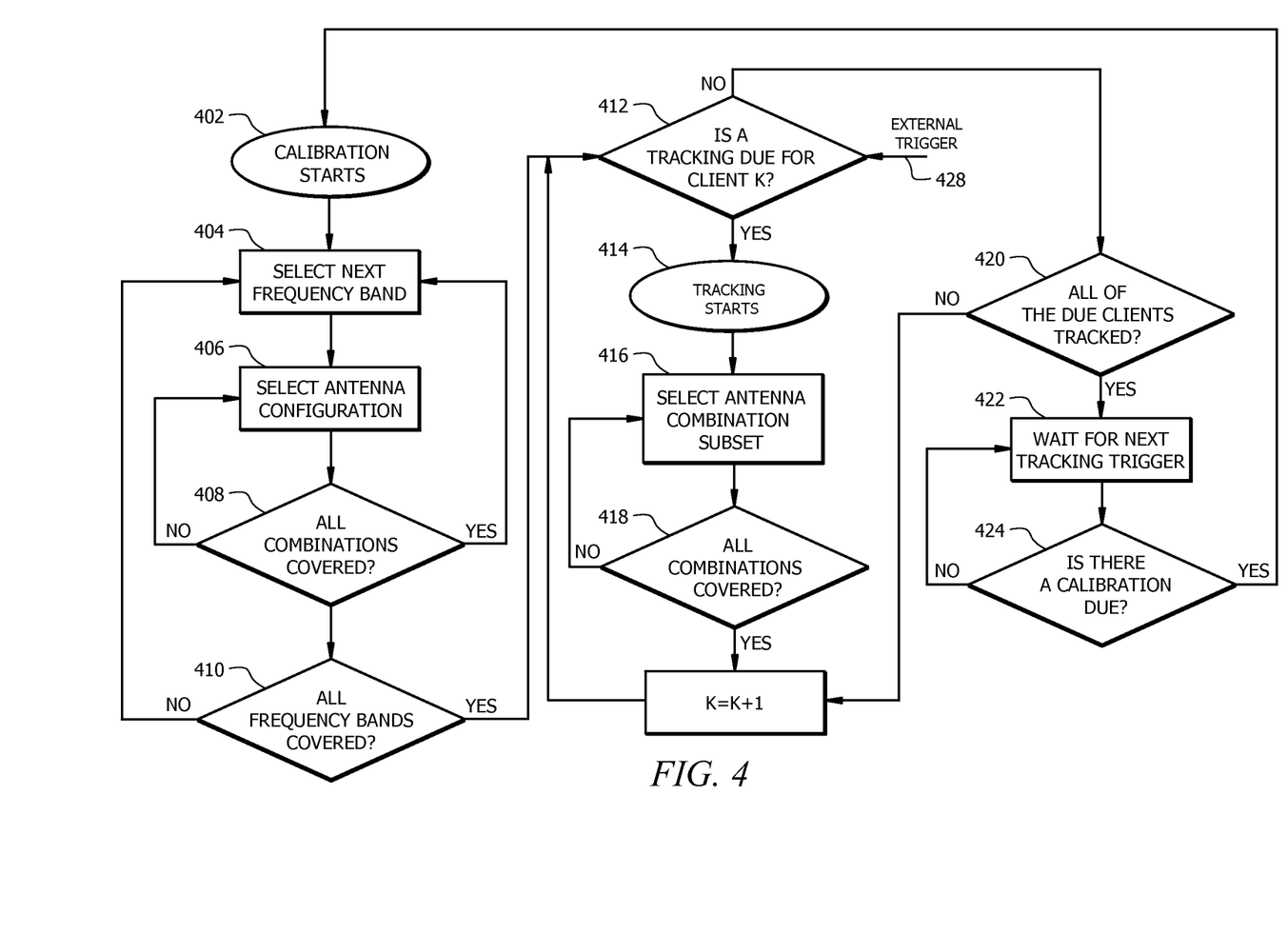
FIG. 4 is a flow chart of an embodiment of an adaptive antenna method algorithm.

FIG. 4 provides a more detailed explanation of the adaptive antenna method 300. For example, blocks 402, 404, and 410 correspond to block 302, blocks 406 and 408 correspond to block 304, blocks 412-420 correspond to block 306, and blocks 422 and 424 correspond to block 308. When calibrating a WLAN device at 402, a WLAN device may employ an implicit beamforming approach (e.g., without client feedback), for example, utilizing a combination of directional antennas (e.g., the beamforming antenna assembly 204) to direct an antenna RF beam or pattern based on a spectral analysis of a received signal power of one or more clients and/or one or more noise sources, as will be disclosed herein. Additionally, an antenna RF beam and/or an antenna configuration may be individually selected for each client device.

In an embodiment, calibrating a WLAN device may comprise selecting a frequency band at 404 (e.g., the 2.4 GHz band or the 5 GHz band) and/or a frequency bandwidth. For example, a bandwidth of 20 Megahertz (MHz) within the 2.4 GHz band may be selected. Alternatively, a bandwidth of 40 MHz, a bandwidth of 100 MHz, any other suitable bandwidth and/or frequency band may be selected as would be appreciated by one of ordinary skill in the art upon viewing this disclosure, or combination thereof.

In an embodiment, an antenna configuration (e.g., a directional antenna RF beam) may be selected from a candidate list at 406. For example, a candidate list may comprise a list of all possible combinations of antenna configurations. Not intending to be bound by theory, in a WLAN device comprising N number of antennas, wherein N is an integer greater than one, $2^N-1$ antenna combinations may exist. In an embodiment, selecting an antenna configuration may provide a directional antenna RF beam towards and/or away from one or more clients and/or noise sources. In an embodiment, the performance of the selected frequency band, frequency bandwidth, and/or antenna configuration may be analyzed. For example, the power spectrum of one or more clients within the frequency band may be measured (e.g., a Fast Fourier Transform (FFT)) and analyzed via a statistical analysis (e.g., average and/or variance computation). Statistical analysis methods are well known in the art, and any suitable statistical analysis method may be used herewith. In an embodiment, the statistical analysis may determine an averaged received power from one or more clients, an averaged received power from one or more noise sources, signal to interference plus noise ratio (SINR), an error rate, a quality of service (QoS), any other suitable performance metric as would be appreciated by one of ordinary skill in the art upon viewing this disclosure, or combination thereof. Additionally, the performance measurements (e.g., a spectral analysis) and/or statistical analysis, similar to that previously disclosed, may be repeated for each of the antenna configurations of the candidate list at 408.

In an embodiment, an antenna configuration may be selected for each of the one or more clients based on the statistical analysis, thereby providing an individual antenna configuration adaptation to the radio channel. For example, an antenna configuration may be selected which maximizes the averaged received power by the client, minimizes the averaged received power from one or more noise sources, minimizes the overall SINR for the client, a minimum error rate for the client, optimizes any other suitable performance metric as would be appreciated by one of ordinary skill in the art upon viewing this disclosure, or combination thereof. In such an embodiment, using the statistical analysis results (e.g., average received power from one or more noise sources) provides interference detection and/or avoidance. Additionally, in an embodiment, one or more antenna configurations may be recorded (e.g., saved onto a data storage device).

Additionally, the performance measurements and/or statistical analysis, similar to that previously disclosed, may be repeated for one or more frequency bands at 410, one or more frequency bandwidths (not shown in FIG. 4), and/or one or more clients (not shown in FIG. 4).

Additionally or alternatively, the performance measurements and/or statistical analysis may be employed to explore multiuser diversity (e.g., opportunistic user scheduling based on channel quality between the WLAN device and one or more clients). For example, calibrating the WLAN device may yield the quality of one or more channels between the WLAN device and the one or more channels and may provide data for a scheduler.

One or more antenna configurations for each client device may be reevaluated, for example, to measure for changes in the propagation environment and/or for client movement. In an embodiment, the WLAN device 100 may continue to monitor the performance of one or more client devices at 412. For example, the performance of the one or more client devices may be measured via explicit feedback (e.g., with client feedback), for example, as defined in IEEE 802.11n and/or 802.11ac standards. Additionally or alternatively, the performance tracking of the one or more clients may be initiated and/or controlled by an external trigger 428 (e.g., a control signal, a timer, etc.).

In an embodiment, when tracking the WLAN device performance at 414, a subset of antenna configuration combinations may be evaluated. For example, the performance of a subset of antenna combinations may be selected and compared to a candidate list of antenna configurations and/or combinations 416. In an embodiment, the subset of antenna combinations may comprise a portion of all possible antenna configuration combinations. Alternatively, the subset of antenna combinations may comprise all possible antenna configuration combinations. In an embodiment, the power spectrum of one or more clients within the frequency band may be measured and an antenna configuration may be selected for each of the one or more clients based on a statistical analysis, similar to what has been previously disclosed. Additionally, a best candidate list may be generated comprising the best $M^{th}$ combinations and/or configurations (e.g., second best, third best, fourth best, etc.), wherein M is an integer greater than one. In an embodiment, the number of M candidates may vary for each client and/or may be determined based on environmental factors, for example, the speed of changes in radio propagation. Additionally, the performance tracking at 414 may be repeated for one or more antenna configurations at 418 and/or one or more clients at 420. In an embodiment, based on the tracking performance measurements and/or analysis results an alternative antenna configuration may be selected and/or implemented for each client.

In an additional or alternative embodiment, the antenna topology (e.g., a beamforming antenna assembly or a MIMO antenna assembly) may be determined and/or changed based on environmental factors, for example, the proximity of the one or more clients to a WLAN device. For example, a beamforming antenna assembly may be used for clients further from the WLAN device and a MIMO antenna assembly may be used for clients used closer to the WLAN device. In an additional or alternative embodiment, the antenna topology may be determined and/or changed based on one or more performance metric (e.g., performance degradation, exceeding an interference or noise level threshold, etc.). In an additional or alternative embodiment, the antenna topology may be determined and/or changed based on any other suitable optimization technique as would be appreciated by one of ordinary skill in the art upon viewing this disclosure. In such embodiments, a switching mechanism may select and/or activate the beamforming antenna assembly or the MIMO antenna assembly, for example, following receiving a control signal from an access point.

In an embodiment, following the calibration and/or tracking of one or more client antenna configurations, the WLAN device may wait at 422 (e.g., transition to an idle state). For example, the WLAN device may no longer measure and/or analyze the performance of the selected antenna configurations of the WLAN device for each client. In such an embodiment, when the WLAN device is in an idle state, the one or more antenna configurations and/or the antenna topology (e.g., a beamforming antenna assembly or a MIMO antenna assembly) for each client may not be changed. In such an embodiment, the WLAN device may continue to receive and/or transmit electrical signals (e.g., data packets) for each client via the previously selected antenna configurations and/or antenna topology for each client. In an embodiment, the WLAN device may remain in an idle state until a predetermined trigger event has occurred at 424. For example, a triggering event may comprise waiting for a predetermined amount of time (e.g., about one second), receiving an external control signal (e.g., from an access point, a processor, etc.), exceeding a performance degradation threshold (e.g., an upper interference or noise threshold, a lower throughput threshold, a lower QoS threshold, a lower SINR threshold, etc.), and/or any other suitable type of triggering event as would be appreciated by one of ordinary skill in the art upon viewing this disclosure. In the embodiment of FIG. 4, following the triggering event the WLAN device may become active (e.g., no longer idle) and begin the calibrating process at 402, similar to that previously disclosed.

Figure 5:
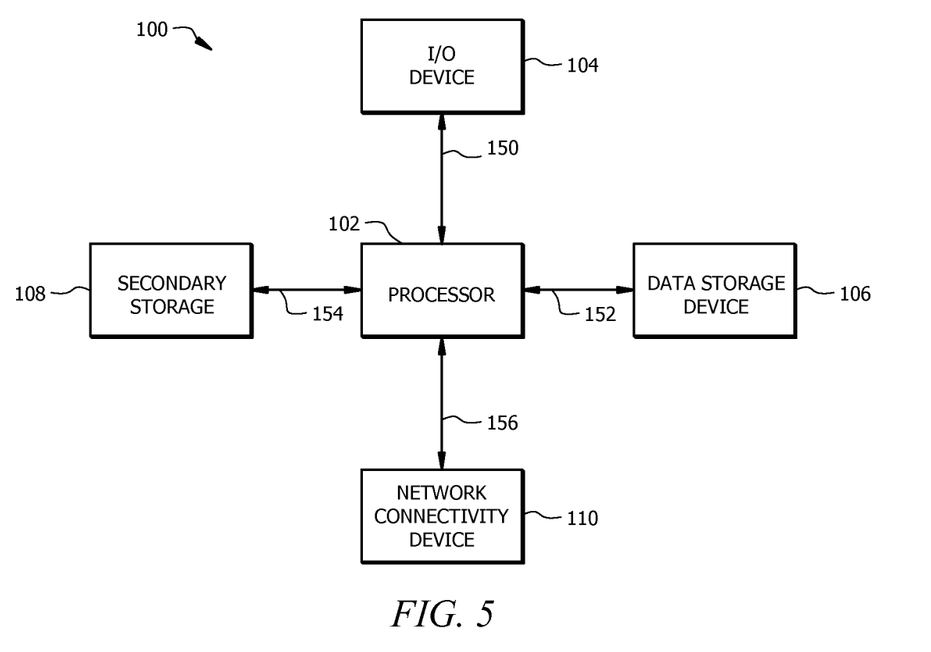
FIG. 5 is a schematic diagram of an embodiment of a portion of a WLAN device.

Referring to FIG. 5, an embodiment of an operating environment in which an adaptive antenna method may be employed is illustrated. In an embodiment, the operating environment generally comprises a plurality of functional units associated with a WLAN device, as will be disclosed herein.

In an embodiment as illustrated in FIG. 5, a WLAN device 100 may comprise a plurality of functional units. In an embodiment, a functional unit (e.g., an integrated circuit (IC)) may perform a single function, for example, serving as an amplifier or a buffer. The functional unit may perform multiple functions on a single chip. The functional unit may comprise a group of components (e.g., transistors, resistors, capacitors, diodes, and/or inductors) on an IC which may perform a defined function. The functional unit may comprise a specific set of inputs, a specific set of outputs, and an interface (e.g., an electrical interface, a logical interface, and/or other interfaces) with other functional units of the IC and/or with external components. In some embodiments, the functional unit may comprise repeated instances of a single function (e.g., multiple flip-flops or adders on a single chip) or may comprise two or more different types of functional units which may together provide the functional unit with its overall functionality. For example, a microprocessor or a microcontroller may comprise functional units such as an arithmetic logic unit (ALU), one or more floating-point units (FPU), one or more load or store units, one or more branch prediction units, one or more memory controllers, and other such modules. In some embodiments, the functional unit may be further subdivided into component functional units. A microprocessor or a microcontroller as a whole may be viewed as a functional unit of an IC, for example, if the microprocessor shares circuit with at least one other functional unit (e.g., a cache memory unit).

The functional units may comprise, for example, a general purpose processor, a mathematical processor, a state machine, a digital signal processor, a video processor, an audio processor, a logic unit, a logic element, a multiplexer, a demultiplexer, a switching unit, a switching element an input/output (I/O) element, a peripheral controller, a bus, a bus controller, a register, a combinatorial logic element, a storage unit, a programmable logic device, a memory unit, a neural network, a sensing circuit, a control circuit, a digital to analog converter, an analog to digital converter, an oscillator, a memory, a filter, an amplifier, a mixer, a modulator, a demodulator, and/or any other suitable devices as would be appreciated by one of ordinary skill in the art.

In the embodiments of FIG. 5, the WLAN device 100 may comprise a plurality of distributed components and/or functional units and each functional unit may communicate with one or more other functional units via a suitable signal conduit, for example, via one or more electrical connections, as will be disclosed herein.

In the embodiment of FIG. 5, the operating environment comprises WLAN device 100 comprising a plurality of interconnected functional units, for example, for transmitting and/or receiving one or more RF signals (e.g., WiFi signals). In the embodiment of FIG. 5, the WLAN device 100 may generally comprise various functional units including, but not limited to a processor 102, an I/O device 104, a data storage device 106, a secondary storage 108, and the network connectivity device 110, arranged as shown in FIG. 5. In such an embodiment, the WLAN device 100 is configured to transmit and/or to receive a RF signal (e.g., a WiFi signal) (e.g., to/from one or more clients or users). While FIG. 5 illustrates a particular embodiment of an operating environment in which an adaptive antenna method may be employed and/or a particular configuration of functional units with which an adaptive antenna method may be associated, upon viewing this disclosure one of ordinary skill in the art will appreciate that an adaptive antenna method as will be disclosed herein may be similarly employed in alternative operating environments and/or with alternative configurations of WLAN device functional units.

In an embodiment, the processor 102, which may be referred to as a central processing unit (CPU), may be configured to control one or more functional units of the WLAN device 100 and/or to control data flow through the WLAN device 100. For example, the processor 102 may be configured to communicate one or more electrical signals (e.g., data packets, control signals, etc.) with the I/O device 104 (e.g., via electrical connection 150), the data storage device 106, (e.g., via electrical connection 152), the secondary storage 108 (e.g., via electrical connection 154), the network connectivity device 110 (e.g., via electrical connection 156), and/or to perform one or more processes on the electrical signals (e.g., authentication, packet monitoring logic, etc.). In such an embodiment, one or more of the processes may be performed in software, hardware, or a combination of software and hardware. Although illustrated as a single processor, the processor 102 may be implemented as one or more CPU chips, cores (e.g., a multi-core processor), digital signal processor (DSP), an application specific integrated circuit (ASIC), and/or any other suitable type and/or configuration as would be appreciated by one of ordinary skill in the arts upon viewing this disclosure.

In an embodiment, the I/O device 104 may be generally configured to transmit electrical signals and/or data signals between the processor 102 and/or the WLAN device 100 and external hardware (e.g., an electrical outlet, a computer, etc.).

In an embodiment, the data storage device 106 may be generally configured to store information (e.g., data) for the WLAN device 100 and may be configured to read and/or to write data to one or more memory cells of the data storage device 106. In an embodiment, the data storage device 106 may comprise a read only memory (ROM), a random access memory (RAM), a flash memory, an external memory (e.g., an secure digital (SD) card), any suitable type of memory device as would be appreciated by one of ordinary skill in the art upon viewing this disclosure, or combinations thereof.

In an embodiment, the secondary storage 108 may be generally configured as additional and/or overflow data storage device. For example, the secondary storage device 108 may be configured to store data of a primary data storage (e.g., the data storage device 106) has insufficient data storage space. In an embodiment, the secondary storage 108 may comprise a disk drives, a tape drive, a ROM, a RAM, an external memory (e.g., an SD card), any suitable type of memory device as would be appreciated by one of ordinary skill in the art upon viewing this disclosure, or combinations thereof.

In an embodiment, an adaptive antenna method and/or a system employing an adaptive antenna method, as disclosed herein or in some portion thereof, may be advantageously employed during wireless communications operations. Conventional methods may employ beamforming techniques which suffer performance degradation in indoor environments, for example, due to multi-path distortion and obstructions. As will be appreciated by one of ordinary skill in the art, an adaptive antenna method, such as the adaptive antenna method 300, may provide effective customization and/or real-time adaptation of an antenna array radio channel in an indoor environment. Additionally, the adaptive antenna method 300 employs a spectral analysis for optimizing an effective direction of arrival or antenna combination and/or topology for implicit measurements, provides minimization through spatial techniques, and provides hardware based interference detection and avoidance. For example, the adaptive antenna method 300 may analyze an indoor environment to determine an antenna configuration and/or an antenna topology which provides optimal performance for one or more clients. Therefore, the methods disclosed herein provide a means by which the performance of the WLAN device can be improved.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A wireless local area network (WLAN) device comprising:
   a processor;
   a transceiver coupled to the processor;
   a switching mechanism coupled to the transceiver;
   a beamforming antenna assembly coupled to the switching mechanism through a first electrical connection; and
   a multiple input multiple output (MIMO) antenna assembly coupled to the switching mechanism through a second electrical connection different than the first electrical connection,
   wherein the processor is configured to calibrate the WLAN device by selecting a frequency spectrum band and a frequency bandwidth, implementing a plurality of directional antenna radio frequency (RF) beams and measuring a power spectrum for a client for each of the directional antenna RF beams, and performing a statistical analysis on the power spectrum of the client,
   wherein the switching mechanism is configured to activate antennas within the beamforming antenna assembly, or the MIMO antenna assembly, but not both the beamforming antenna assembly and the MIMO antenna assembly at the same time, and
   wherein the processor is configured to repeatedly track the WLAN device performance for one or more antenna configurations and for one or more clients to generate alternative antenna configurations that may be selected, wherein tracking the WLAN device performance comprises performing a statistical analysis on the power spectrum of the client, wherein the statistical analysis uses an average or variance computation.

2. The device of claim 1, wherein the switching mechanism is configured to activate the beamforming antenna assembly or the MIMO antenna assembly but not both simultaneously per communication link or channel based on a statistical analysis.

3. The device of claim 1, wherein the wireless local area network device is configured to employ two or more communication channels or links to communicate with two or more clients, wherein the wireless local area network device simultaneously employs a first communication link generated by the beamforming antenna assembly and a second communication link generated by the MIMO antenna assembly.

4. The device of claim 1, wherein the beamforming antenna assembly comprises a plurality of non-directional antennas.

5. The device of claim 1, wherein the beamforming antenna assembly comprises a plurality of directional antennas.

6. An apparatus comprising:
   a processor; and
   a memory coupled to the processor, wherein the memory comprises instructions that cause the processor to:
   calibrate a wireless local area network (WLAN) device, wherein calibrating the WLAN device comprises selecting a frequency spectrum band and a frequency bandwidth, implementing a plurality of directional antenna radio frequency (RF) beams and measuring a power spectrum for a client for each of the directional antenna RF beams, and performing a statistical analysis on the power spectrum of the client;

select an optimal antenna configuration by switching to one of a first set of antennas within a beamforming antenna assembly and a second set of antennas within a multiple input multiple output (MIMO) antenna assembly using a switching mechanism, wherein the first set of antennas in the beamforming antenna assembly and the second set of antennas in the MIMO antenna assembly are configured for mutually exclusive use based on the switching;

repeatedly track the WLAN device performance for one or more antenna configurations and for one or more clients to generate alternative antenna configurations that may be selected, wherein tracking the WLAN device performance comprises performing a statistical analysis on the power spectrum of the client, wherein the statistical analysis uses an average or variance computation; and wait for a triggering event.

7. The apparatus of claim 6, wherein selecting the optimal antenna configuration for a client is based on a spectral analysis.

8. An adaptive antenna method comprising:

calibrating a wireless local area network (WLAN) device, wherein calibrating the WLAN device comprises selecting a frequency spectrum band and a frequency bandwidth, implementing a plurality of directional antenna radio frequency (RF) beams and measuring a power spectrum for a client for each of the directional antenna RF beams, and performing a statistical analysis on the power spectrum of the client;

selecting an optimal antenna configuration by switching to one of a first set of antennas in a beamforming antenna assembly and a second set of antennas in a multiple input multiple output (MIMO) antenna assembly using a switching mechanism, wherein the first set of antennas in the beamforming antenna assembly are not in use when the second set of antennas in the MIMO antenna assembly are in use, and wherein the first set of antennas in the beamforming antenna assembly are in use when the second set of antennas in the MIMO antenna assembly are not in use;

repeatedly tracking the WLAN device performance for one or more antenna configurations and for one or more clients to generate alternative antenna configurations that may be selected, wherein tracking the WLAN device performance comprises performing a statistical analysis on the power spectrum of the client, wherein the statistical analysis uses an average or variance computation; and waiting for a triggering event.

9. The method of claim 8, wherein selecting the optimal antenna configuration for the client is based on the statistical analysis.

10. The method of claim 9, wherein selecting the optimal antenna configuration is based on a minimum averaged received power of an interference source.

11. The method of claim 9, wherein selecting the optimal antenna configuration is based on a minimum averaged received power of a noise source.

12. The method of claim 9, wherein selecting the optimal antenna configuration is based on a maximum overall signal to interference plus noise ratio.

13. The method of claim 8, wherein selecting the optimal antenna configuration comprises activating a beamforming antenna assembly or a multiple input multiple output (MIMO) antenna assembly but not both simultaneously per communication link or channel.

14. The method of claim 8, wherein the triggering event comprises waiting for a predetermined amount of time.

15. The method of claim 8, wherein the triggering event comprises receiving a control signal.

16. The method of claim 15, wherein the control signal is in response to a quality of service falling below a lower threshold.

* * * * *